Patented Jan. 15, 1935

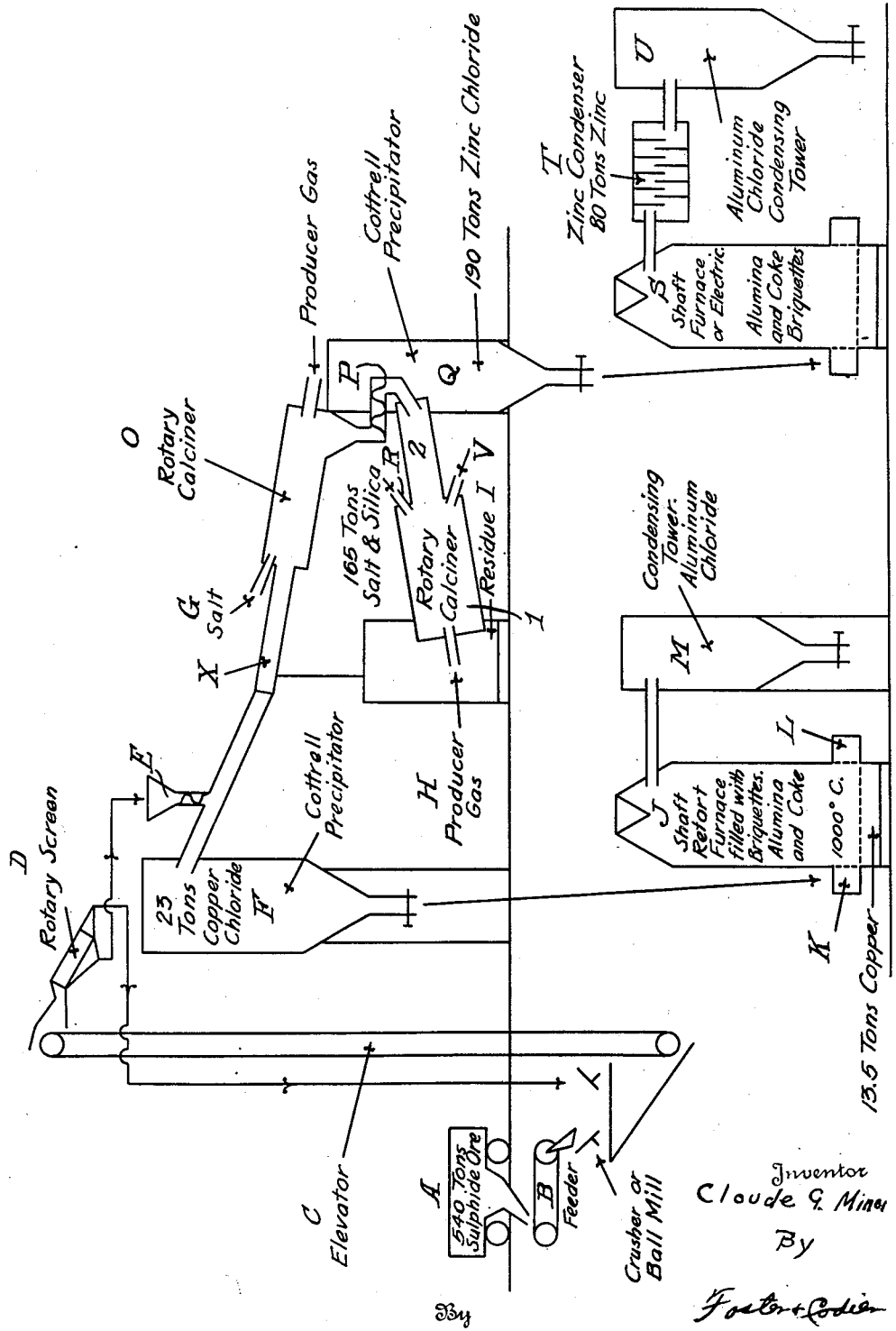

1,987,629

UNITED STATES PATENT OFFICE 1,987,629

PROCESS FOR THE PRODUCTION OF METALLIC ALUMINUM, OR ALUMINUM CHLORIDE AND CERTAIN METALS AS BY-PRODUCTS

Claude G. Miner, Berkeley, Calif., assignor of one-half to Dudley Baird

Application July 2, 1932, Serial No. 620,695

22 Claims. (Cl. 23—95)

This process relates to the manufacture of anhydrous aluminum chloride and the recovery of certain metals other than aluminum or compounds of said metals. It is known that aluminum chloride is a valuable catalytic agent for the synthesis of certain organic compounds and for the cracking of oil, but the cost of production or technical difficulties have prevented its universal adoption. The aluminum chloride produced by this process can also be electrolyzed to produce metallic aluminum.

The process of the present invention produces anhydrous aluminum chloride in a cheap and simple manner and gives valuable by-products. The source and cost of chlorine has been one of the chief difficulties heretofore in the production of aluminum chloride on a large scale for the cracking of oil. Furthermore this process admits of the practical use of aluminous materials not considered feasible in the operation of other processes.

I propose to secure a cheap source of chlorine by reaction of certain chlorides with aluminous materials mixed with a carbonaceous material in proper proportion. For illustration I find that cuprous chloride reacts with alumina and coke at a temperature of 1000° C.; lead chloride and ferrous chloride, at a temperature of about 1200° C.; and zinc chloride, at a temperature of about 1450° C. The respective reactions follow:

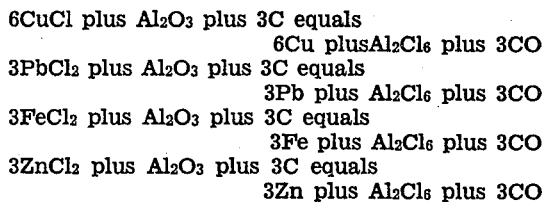

6CuCl plus Al$_2$O$_3$ plus 3C equals
                6Cu plus Al$_2$Cl$_6$ plus 3CO
3PbCl$_2$ plus Al$_2$O$_3$ plus 3C equals
                3Pb plus Al$_2$Cl$_6$ plus 3CO
3FeCl$_2$ plus Al$_2$O$_3$ plus 3C equals
                3Fe plus Al$_2$Cl$_6$ plus 3CO
3ZnCl$_2$ plus Al$_2$O$_3$ plus 3C equals
                3Zn plus Al$_2$Cl$_6$ plus 3CO Certain temperatures have been given for the reactions, but I do not limit myself to these specific temperatures as higher temperatures can be used, which would speed up the time of the reaction.

It is known that ores of gold, silver, copper, and lead can be commercially chloridized and the chlorides of these metals volatilized from their ores and the metals recovered from the fumes. By charging the ore, salt, and sulfur mixture as quickly as possible into the hot zone of the furnace, volatilization begins at about 750° C. and is completed within 30 to 60 minutes. The process can be made continuous and the ore is commercially devoid of value as it discharges from the furnace. Lead is the most easily volatilized of all the metals as a chloride and the chloride is easily formed by chloridizing roasting. Iron and nickel can be chloridized by using certain precautions, and nickel as well as gold and silver chlorides react, according to my present invention, with a mixture of aluminous material and a carbonaceous material to form aluminum chloride and the respective metal. The metallic chloride fumes may be condensed and collected in a Cottrell precipitator.

As an illustration of the practical operation of the process of my invention, reference is made to the accompanying flow sheet. A typical California complex ore is taken as an example. The ore selected contained 3% copper, 17% zinc, 20% iron, gold about .4 of an oz., and silver about 17 oz.

Starting with 540 tons of the complex sulfide ore as it comes from the mine, it goes for uniformity first to a feeder B, second to a crusher or ball mill where the ore is crushed to about twenty mesh, and then thru the rotary screen D by means of the elevator C. From the screen, the 540 tons of ore go to the rotary calciner X—O thru the feeding device E. In this kiln the copper along with the gold and silver is chloridized to copper chloride, gold chloride, and silver chloride. 55 tons of salt (sodium chloride) are fed in at G so as to give the sulfide a preliminary roast and provide a counter current flow of solids and gases so that no salt or as little as possible will volatilize with the metal chlorides. About 23 tons of copper, gold, and silver chlorides will volatilize and are precipitated in the Cottrell precipitator F. Zinc is volatilized according to the sulfur content of the ore. In this illustrative example, the ore is given a preliminary roast so that the remaining sulfur content is only sufficient to combine with the copper, gold, and silver. Hence the zinc will pass on and gravitate down with the iron, sodium sulfate, etc., passing thru the device P which is designed to allow the solid material to pass from the upper to the lower rotary without permitting any gaseous material to pass from the lower to the upper rotary.

As a source of raw aluminous materials, it is possible to use grade clay, bauxite, alunite residue, silicates, etc. For illustrative purposes, alunite residue going about 80% alumina will be taken as an example.

About six tons of alunite residue are mixed with approximately two tons of coke, 80% carbon, and made into briquettes. The said briquettes are placed in a furnace J which is maintained at about 1200° C. The copper, gold, and silver chlorides will react with an aluminous material and coke at about 1000° C. but a higher temperature is maintained in this so that the copper, gold, and silver, will melt and run down into the bottom of the furnace J from whence they can be tapped off as desired. The 23 tons of copper, gold, and silver chlorides are placed in chambers K and L and volatilized up thru the briquettes as indicated in the flow sheet.

An alternative method is to mix the copper, gold, and silver chlorides in with the alunite residue and coke, and then make briquettes out of the total mixture. The said briquettes are then heated up to the required temperature.

About ten tons of aluminum chloride forms and approximately 13.5 tons of copper with the gold and silver. Pure aluminum chloride can be produced by this process. Aluminum is more readily chloridized than copper, gold, silver, lead, iron, zinc, and silicon, all of the latter chlorides being reduced by alumina and coke. Hence it is only essential to have the alumina and coke in suitable excess whereby all of the said latter chlorides are reduced to the metal. A suitable method of doing this, is to interpose a furnace between J and M and fill this with briquettes of alunite residue and coke, and maintain this interposed furnace at a rather high temperature, 1500° C. or so. This will remove any heavy metal chlorides, and allow the aluminum chloride to pass over in the pure condition.

If desired, the aluminum chloride can be electrolyzed by any suitable method to produce aluminum and chlorine. The chlorine can be allowed to pass up the lower rotary counter current to the down coming material which is hot. Zinc chloride will form, volatilize, and condense in Q and be placed on the market as such.

In case it is desired to chloridize the zinc for reaction with an aluminous material and coke, this is accomplished in the lower rotary. A neutral atmosphere or slightly reducing atmosphere is maintained in the upper part 2 of the lower rotary while an oxidizing atmosphere is maintained in the lower part 1 of the lower rotary. This is accomplished by feeding in producer gas, fuel oil, etc. at H. Fuel oil, gas etc. is introduced at V so as to change the oxidizing atmosphere into a reducing one in the upper part of the lower rotary. About 165 tons of salt or preferably an equivalent amount of calcium chloride are fed into the lower rotary at R and sufficient silica so that for every two pounds of salt there is a pound of silica or better. About 190 tons of zinc chloride form, volatilize, and are precipitated in Q. About fifty tons of alunite residue are mixed with twenty tons of coke and made into briquettes. The 190 tons of zinc chloride are volatilized up thru the briquettes as shown by the flow sheet. Volatilization of chlorides up thru briquettes can be accomplished advantageously by doing so in a neutral dry atmosphere, as producer gas. The furnace S is kept at 1450° to 1470° C. As both the zinc and aluminum chloride volatilize, it is necessary to have separate condensers and make use of their different volatilization or boiling points for the separate condensation as illustrated by the flow sheet.

Another illustration of the practical operation of this process can be given. Assume that it is desired to operate a low grade copper ore that runs about 3% copper, 40% iron, and 46% sulfur. Assume further that it is desired to produce the greatest amount of anhydrous aluminum chloride economically possible. Take 540 tons of the ore, for example, and grind it to about twenty mesh. A rotary, Wedge, or Herreshoff furnace can be used. Give the ore a preliminary sulphating roast and maintain such conditions as will convert the iron to iron sulfate. To accomplish this, it is preferable to use dry air, and it is essential to maintain the partial pressure of the sulfur trioxide in the furnace above the sulfates above the critical point. At 614° C., for illustration, this is 70 mm. In a Wedge or Herreshoff furnace, this can be accomplished in the upper part of the furnace. Lower down in the furnace, about 480 tons of salt (sodium chloride) are fed into the furnace. Upon chloridization of the copper, iron, gold, and silver, the temperature is raised so as to volatilize the copper, iron and other chlorides which requires about 1000° C. These chlorides are then placed in a muffle furnace as J in the flow sheet and just sufficient briquettes of aluminous material and coke added to react with the copper, gold, and silver chlorides which chlorides not only act first, in preference to iron chloride, with alumina and coke but at a lower temperature than iron. A temperature of about 1000° C. is maintained until the reaction is complete, whereupon the temperature is raised so that the resultant copper, silver, and gold will melt and run down into the bottom of the furnace from whence it can be tapped off as blister copper. The resultant aluminum chloride together with the original iron chloride will volatilize off and are passed into another similar furnace and up the requisite amount of briquettes of alumina and coke, which is determined by reference to the original reactions, an excess of alumina and coke being essential. About 190 tons of pig iron result and 375 tons of aluminum chloride. In the second furnace, the reaction of the iron chloride with the briquettes will take place at about 1200° C. but it is necessary to raise the temperature in order to melt the iron.

In the flow sheet, the furnaces J and S are retort furnaces or electric furnaces. A surface combustion retort furnace can be used. A high frequency-induction electric furnace can be used and it will assist the reactions by means of the high frequency induced current.

These illustrations will explain the application of the process. Other types of apparatus can be used and the methods varied to suit conditions and the type of ore.

Cupric chloride can also be used, but this decomposes into cuprous chloride and chlorine at high temperatures, so the real reaction would be as follows:

$3CuCl_2$ plus heat equals $3CuCl$ plus $3Cl$ and then $3CuCl$ plus $3Cl$ plus $Al_2O_3$ plus $3C$ equals $3Cu$ plus $Al_2Cl_6$ plus $3CO$.

Cupric chloride decomposes at a red heat while the temperature of reaction between cuprous chloride and a mixture of alumina and carbonaceous material has been given. Ferric chloride acts similar to cupric chloride. It decomposes into ferrous chloride and chlorine and then these jointly act upon the alumina and coke to form iron, aluminum chloride, and carbon monoxide.

An advantage of this process, as illustrated hereinbefore, is the ease and cheap source by which the chlorides of copper, lead, iron, etc. can be obtained. For illustration, chalcopyrite 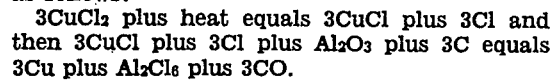($CuFeS_2$) is an abundant ore of copper. When this is carefully roasted with salt under proper conditions, iron and copper chlorides are obtained and sodium sulfate. Several reactions may take place but in the main, the reaction can be represented as follows:

CuFeS₂ plus 4NaCl plus 8O (8 oxygen) equals CuCl₂ plus FeCl₂ plus 2Na₂SO₄.

This is known and mentioned here for explanation only. The copper chloride and iron chloride are preferably volatilized from the sodium sulfate for purposes of this process. As is also known, the copper can be chloridized preferentially in reference to the iron. The manner of treating the mixture of alumina and coke has already been described. Another method would be to precipitate out the copper first. This can be accomplished by passing both chlorides over iron oxide and coke in proper proportion at the temperature whereby sponge iron is produced. The copper is precipitated and more iron chloride formed. The total amount of iron chloride can then be used to treat an aluminous material and coke to obtain iron and aluminum chloride.

Other known reactions that can be utilized to obtain iron and (or) copper chlorides are as follows:

2NaCl plus FeSO₄ equals Na₂SO₄ plus FeCl₂ which is volatile 2NaCl plus CuSO₄ equals Na₂SO₄ plus CuCl₂ which is volatile.

Another advantage of this process is the ability to use aluminous materials other than bauxite as alunite residue, and more particularly clay, and other silicates. If we represent clay by the formula, Al₂O₃.3SiO₂, its reaction with cuprous chloride can be represented as follows:

Al₂O₃.3SiO₂ plus 9C plus 6CuCl equals Al₂Cl₆ plus 9CO plus 3Cu₂Si.

This would give a silicide of copper, which would require subsequent treatment to obtain metallic copper. In treating silicates, therefore, I prefer to use iron chloride. Copper pyrite can be chloridized to obtain copper and iron chlorides. The copper is precipitated out by any suitable method as by iron or sponge iron at the melting temperature of copper. The iron chloride can then be caused to act upon the silicate and coke. A suitable method of applying this feature of the process is to utilize a superimposed system of electric rotaries. The upper rotary is kept at a temperature of about 1500° to 2000° C., and contains the aluminous material and carbon over or thru which the metal chloride passes in the vapor state; while the lower electric rotary contains iron oxide and coke, over or thru which the metal chloride vapors pass, is kept at the temperature at which coke reduces iron oxide to form sponge iron. The double chloride of copper and iron, as obtained from chloridizing copper pyrite, is passed as a vapor up and thru the lower rotary furnace. The sponge iron formed herein precipitates the copper which gravitates out of the lower end of the said lower rotary furnace. The resulting iron chloride together with the original iron chloride passes up as a vapor into the lower end of the upper superimposed rotary electric furnace and thereupon up thru said rotary over and counter current to the silicate and coke or carbon. A counter current principle is also used in the lower rotary. The reaction in the upper rotary can be represented as follows:

Al₂O₃.3SiO₂ plus 9C plus 3FeCl₂ equals Al₂Cl₆ plus 9CO plus 3FeSi.

Hence using iron chloride and an aluminum silicate, aluminum chloride is not only obtained but it is also possible to obtain a ferro-silicon alloy. In the case described, copper is also obtained. If coke is added in excess in the upper rotary retort, then a ferro-silicon carbide is obtained.

The principle of this process can also be applied to alumina-potash silicates, as feldspar, leucite, etc. Taking potash feldspar as an example, we can represent the reaction as follows:

K₂O.Al₂O₃.6SiO₂ plus 16C plus 4FeCl₂ equals 2(KCl.AlCl₃) plus 16CO plus 6Si.4Fe.

A ferro-silicon is also obtained in this case. Instead of aluminum chloride, however, a double chloride of aluminum and potassium is obtained, which can be used for the production of aluminum or other purposes.

With silicates, the reaction works well around 1500° to 2000° C. While the counter current principle is preferred, it is not essential. The aluminous material can be made into briquettes with the proper ratio of coke, and the chloride of copper or (as described) iron passed up thru said briquettes. It will be realized, however, in this case that it is more difficult to obtain a complete reaction and obtain a total reduction of the copper and iron chlorides, as the case may be. Besides the chlorides of copper and iron used as described above in the production of aluminum chlorides and metal or metal compound (copper silicide, ferro silicon alloy etc.), the chlorides of lead, zinc, silver, gold, nickel, silicon may be used either alone or in combination, depending upon the source of the chloride or its method of preparation. In fact, any chloride whose metal is electro-negative to aluminum is suitable.

For the reactions heretofore described, a suitable furnace is a rotary electric induction furnace of the Northrup type.

The ratio of the ingredients will be known from the description herein given. A slight excess of carbon or coke as well as of alumina is usually required over that given by the reactions. For reactions of this type, say 10 to 15%.

From this description, one skilled in the art can make changes to suit local conditions, type of ore etc. so as to effect a practical and economical operation of the process without deviating from the principles involved herein. Sulfide ores can also be treated by the Swinburne-Ashcroft process or its modifications to produce the metallic chlorides. These chlorides can then be utilized to treat an aluminous material and coke to produce aluminum chloride and a metal or metals. The aluminum chloride can then be electrolyzed to produce aluminum and chlorine, the latter being kept in the cycle.

Having described my invention what I claim is;

1. The process of producing aluminum chloride and a metal below aluminum in the electromotive series of the metals, which comprises reacting upon an aluminous material with such metal chloride and a reducing agent at a temperature at which reaction takes place to form aluminum chloride and the metal.

2. The process of producing aluminum chloride and a metal below aluminum in the electromotive series of the metals, which comprises reacting upon an oxygen containing compound of aluminum in the presence of a carbonaceous material with such metal chloride capable of forming aluminum chloride and the metal therewith.

3. The process of producing aluminum chloride which comprises reacting upon an aluminous material with a carbonaceous material and with a chloride of a metal below aluminum in the electromotive series of the metals, the carbon and the chloride of the said metal both being in the presence of the aluminous material during the reaction.

4. The process of producing aluminum chloride and other products from a material containing aluminum in combination with oxygen which comprises reacting upon said material in the presence of a reducing agent with the vaporizable chloride of a metal below aluminum in the electromotive series of the metals.

5. The process of producing aluminum chloride and other useful products from a material containing aluminum in combination with oxygen which comprises reacting upon said material in the presence of carbon with the vapor of a vaporizable chloride of a metal below aluminum in the electromotive series of the metals.

6. The process of producing aluminum chloride and other useful products from a material containing aluminum in combination with oxygen which comprises reacting upon said material with carbon in the presence of the vapor of a chloride of an element below aluminum in the electro-chemical series in relation to the affinity for chlorine.

7. The process of producing aluminum chloride and other useful products from a material containing aluminum in combination with oxygen which comprises reacting upon said material with a carbonaceous material and the chloride of an element below aluminum in the electro-chemical series in relation to the affinity for chlorine, the said reaction taking place at a temperature at which aluminum chloride is produced.

8. The process of producing aluminum chloride and other useful products from a material containing aluminum in combination with oxygen which comprises reacting upon said material in the presence of carbon with cuprous chloride at a temperature at which aluminum chloride is produced.

9. The process of producing aluminum chloride which comprises simultaneously reacting upon an aluminous material with carbon and copper chloride at a temperature at which aluminum chloride is produced.

10. The process of producing aluminum chloride and metallic copper which comprises reacting upon aluminum oxide with cuprous chloride in the presence of a reducing agent at a temperature of at least approximately 1000° C.

11. The process of producing aluminum chloride and metallic copper which comprises reacting upon an aluminous material with copper chloride in the presence of a reducing agent at a temperature of at least approximately 1000° C.

12. The process of producing aluminum chloride and metallic lead which comprises reacting upon an aluminous material with lead chloride in the presence of a reducing agent at a temperature of at least approximately 1200° S.

13. The process of producing aluminum chloride and metallic iron which comprises reacting upon an aluminous material with iron chloride in the presence of a reducing agent at a temperature of at least approximately 1200° C.

14. The process of producing aluminum chloride by reacting upon an aluminous material concurrently with carbon and a chloride of a metal or metals selected from the group consisting of copper, iron, zinc, lead, silver and gold.

15. The process of producing aluminum chloride from a material containing aluminum in combination with oxygen by reacting upon said material concurrently with a suitable reducing agent and a chloride of a metal or metals selected from the group consisting of copper, iron, zinc, lead, silver and gold.

16. The process of producing aluminum chloride from an oxygen containing compound of aluminum which comprises reacting conjointly upon said compound at an elevated temperature with carbon and a chloride of a metal below aluminum in the electromotive series of the metals.

17. The process of producing aluminum chloride and metallic zinc which comprises reacting upon an aluminous material with zinc chloride in the presence of a reducing agent at a temperature of at least approximately 1450° C.

18. The process of producing aluminum chloride from an aluminous material which comprises in mixing in proper proportion the aluminous material, a suitable reducing agent, and the chloride of a metal or metals selected from the group consisting of copper, iron, zinc, lead, silver and gold, and thereupon making this mixture into briquettes and heating said briquettes in a neutral atmosphere to a temperature at which aluminum chloride is produced.

19. The process of producing aluminum chloride from an aluminous material which comprises mixing the aluminous material with a suitable reducing agent, making the said mixture into briquettes, and thereupon passing the vapors of a chloride of a metal or metals selected from the group consisting of copper, iron, zinc, lead, silver and gold, up thru said briquettes in a neutral atmosphere at a temperature at which aluminum chloride is produced.

20. The process of producing aluminum chloride which comprises reacting concurrently upon an aluminous material with a chloride of a metal below aluminum in the electromotive series of the metals and with a reducing agent for removing oxygen from combination with the aluminous material to place the aluminum in condition for reaction with said chloride of said metal.

21. The process of producing aluminum chloride which comprises reacting upon aluminous material concurrently with the chloride of a metal below aluminum in the electromotive series of the metals and a reducing agent.

22. The process of producing aluminum chloride by simultaneously reacting at an elevated temperature with a reducing agent and a chloride of a metal below aluminum in the electromotive series of the metals upon a material containing aluminum in combination with oxygen.

CLAUDE G. MINER.